US011419423B1

(12) United States Patent
Wu

(10) Patent No.: US 11,419,423 B1
(45) Date of Patent: Aug. 23, 2022

(54) DETACHABLE GAMING CHAIR

(71) Applicant: GENOVA INC., Diamond Bar, CA (US)

(72) Inventor: Peng Wu, Shanghai (CN)

(73) Assignee: GENOVA INC., Diamond Bar, CA (US)

(*) Notice: Subject to any disclaimer, the term of this patent is extended or adjusted under 35 U.S.C. 154(b) by 0 days.

(21) Appl. No.: 17/579,853

(22) Filed: Jan. 20, 2022

(51) Int. Cl.
A47C 4/02 (2006.01)
A47C 7/40 (2006.01)
F16B 12/40 (2006.01)
A47C 7/00 (2006.01)

(52) U.S. Cl.
CPC ............... A47C 7/40 (2013.01); F16B 12/40 (2013.01); A47C 7/006 (2013.01)

(58) Field of Classification Search
CPC .................................. A47C 7/40; F16B 12/40
USPC ..... 297/284.9, 440.2, 452.18, 452.2, 452.33, 297/452.34, 452.41
See application file for complete search history.

(56) References Cited

U.S. PATENT DOCUMENTS

| 6,739,671 | B2* | 5/2004 | De Maina | B60N 2/7029 297/440.2 X |
| 7,125,074 | B2* | 10/2006 | Real | A47C 15/004 297/217.3 |
| 7,322,653 | B2* | 1/2008 | Dragusin | A63F 13/98 297/301.2 |
| 8,777,313 | B2* | 7/2014 | Butt | A63F 13/98 297/85 M |
| 8,858,343 | B2* | 10/2014 | Filipour | A47C 7/727 463/47 |
| 8,991,926 | B2* | 3/2015 | Johansson | A61G 5/1043 297/440.2 X |
| 10,244,870 | B1* | 4/2019 | Bobst | A47C 7/5062 |
| 10,653,242 | B2* | 5/2020 | Ortiz | A47C 7/72 |
| 10,986,927 | B2* | 4/2021 | Fiden | A47C 7/62 |
| 11,224,293 | B2* | 1/2022 | Case | A47C 21/003 |
| 2005/0168021 | A1* | 8/2005 | Real | A47C 15/004 297/217.3 |
| 2006/0202528 | A1* | 9/2006 | Liu | B60N 2/686 297/284.9 |
| 2007/0257530 | A1* | 11/2007 | Florez | A47C 15/004 297/217.3 |
| 2008/0111408 | A1* | 5/2008 | Duran | A63F 13/98 297/217.3 |

(Continued)

Primary Examiner — Rodney B White
(74) Attorney, Agent, or Firm — Bayramoglu Law Offices LLC

(57) ABSTRACT

A detachable gaming chair, including a backrest, a seat, two armrests, a bracket, and rollers. The backrest includes a backrest main body and left and right wings. The backrest main body includes an upper frame and a lower frame. At the connection point of the upper and lower frame, the lower frame is located inside the upper frame, and the left and right wings are detachably connected to both sides of the backrest main body. The detachable gaming chair of the present invention adopts a compact backrest structure, which reduces the occupied space, makes the outer contour of the backrest shoulder smoother, and is easy to install and disassemble. The backrest adopts a square tube butt-insertion structure, which is not easy to rotate, which can make the left and right wings and the backrest main body more firmly connected, and will not be loose or deformed after long-term use.

6 Claims, 2 Drawing Sheets

(56) References Cited

U.S. PATENT DOCUMENTS

2012/0223555 A1\* 9/2012 Brown, Jr. ........... A47C 15/004
297/217.4 X

\* cited by examiner

DETACHABLE GAMING CHAIR

TECHNICAL FIELD

The present invention relates to the technical field of gaming chairs, in particular, to a detachable gaming chair.

BACKGROUND

Gaming chair, referred to as E-sports chair. E-sports is an activity in which electronic game competitions reach the "competitive" level. E-sports is an intellectual confrontation between people using electronic equipment as sports equipment. The design of gaming chair conforms to ergonomics, which is convenient for the user's gaming operation and experience. Because some games require a high degree of user energy and sitting for a long time, gaming chair can ensure the user's comfort.

Gaming chairs generally include parts such as backrest, seat, armrests, and chair legs. The chair legs also include brackets and rollers. At present, the backrest, seat, armrests or chair legs are generally detachable. In addition, because the design of backrest and seat requires comfort, the backrest also has side wings on both sides, which form a certain angle with the backrest. The side wings are fixed on both sides of the backrest by welding or the like, or fixedly connected to both sides of the backrest in a detachable manner. However, this connection method occupies a large space, so a detachable gaming chair with a more compact backrest structure is required.

SUMMARY

In order to overcome the shortcomings of the prior art, the present invention provides a detachable gaming chair, which has a compact backrest structure and can reduce the occupied space.

In order to solve the above technical problems, the present invention provides the following technical solutions:

A detachable gaming chair includes a backrest, a seat, two armrests, a bracket, and rollers. The backrest includes a backrest main body and left and right wings. The backrest main body includes an upper frame and a lower frame. At the connection point of the upper frame and the lower frame, the lower frame is located inside the upper frame, and the left and right wings are detachably connected to both sides of the backrest main body.

Preferably, the upper frame and the lower frame are hollow tubes, the upper frame has an inverted V shape, and the lower frame has a U shape.

Preferably, the lower end of the upper frame and the upper end of the lower frame are fixedly connected by welding.

Preferably, the outer diameter of the upper end of the left and right wings is slightly smaller than the inner diameter of the lower end of the upper frame.

Preferably, the lower end of the upper frame has a nozzle, and the upper ends of the left and right wings can be inserted into the nozzle of the lower end of the upper frame.

Preferably, the lower end of the upper frame and the upper end of the left and right wings are constructed as a square tube butt-insertion structure.

Preferably, both sides of the backrest main body are also threadedly connected with the left and right wings.

The detachable gaming chair of the present invention adopts a compact backrest structure, which reduces the occupied space, makes the outer contour of the shoulder of the backrest smoother, and is easy to install and disassemble. In addition, the backrest adopts a square tube butt-insertion structure, which is not easy to rotate, which can make the left and right wings and the backrest main body more firmly connected, and will not be loose or deformed after long-term use.

DESCRIPTION OF THE DRAWINGS

The invention publication will be described in detail below with reference to the drawings and specific embodiments.

DETAILED EMBODIMENTS

The embodiments of the present invention will be described below with references to the drawings in the specification. It should be noted that the embodiments involved in this specification are not exhaustive, and do not represent the only embodiments of the present invention. The following corresponding examples are only for clearly illustrating the content of the invention publication, and are not intended to limit the embodiments means thereof. For those of ordinary skill in the art, different forms of changes and modifications can be made on the basis of the description of this embodiment. Any obvious changes or modifications that belong to the technical concept and content of the invention publication are also within the scope of protection of the invention publication.

EXAMPLE

Figure 1:
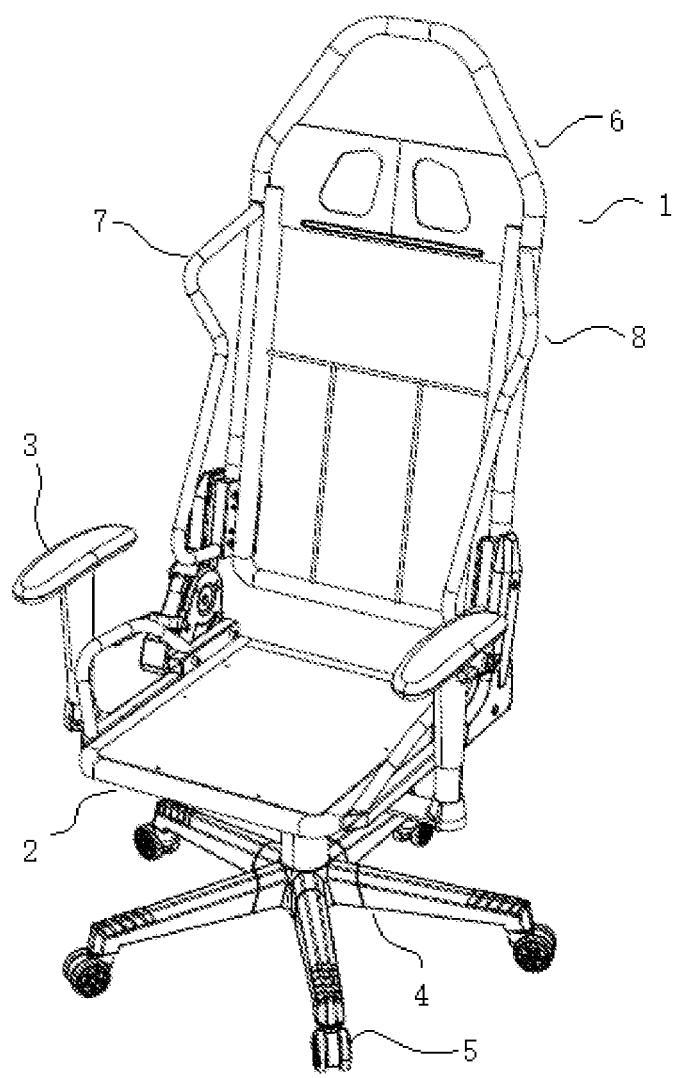
FIG. 1 is a structural stereogram of the detachable gaming chair of the present invention.

FIG. 1 is a structural stereogram of the detachable gaming chair of the present invention. The figure shows the inner steel frame structure. In actual products, the inner steel frame structure is covered with soft pack material. As shown in FIG. 1, a detachable gaming chair of the present invention includes a backrest 1, a seat 2, armrests 3, a bracket 4, and rollers 5. The backrest 1 and the seat 2 are rotatably connected. Both sides of the seat 2 are fixedly provided with Armrests 3. A bracket 4 is provided under the seat 2, and a plurality of rollers 5 are connected to the bottom of bracket 4.

The backrest 1 includes a backrest main body 6 and left and right wings 7 and 8, and the left and right wings 7 and 8 are detachably connected to both sides of the backrest main body 6. Specifically, the backrest main body 6 includes an upper frame 61 and a lower frame 62, and the lower frame 62 is located inside the upper frame 61 at the connection point of the upper frame 61 and the lower frame 62. Preferably, the upper frame 61 and the lower frame 62 are hollow tubes, and specifically can be square tubes. The upper frame 61 has an inverted V shape, and the lower frame 62 has a U shape. In some embodiments, the lower end 61a of the upper frame 61 and the upper end 62a of the lower frame 62 are fixedly connected by welding. Generally, the upper frame 61 and the lower frame 62 are integrally welded and formed in factory.

Figure 2:
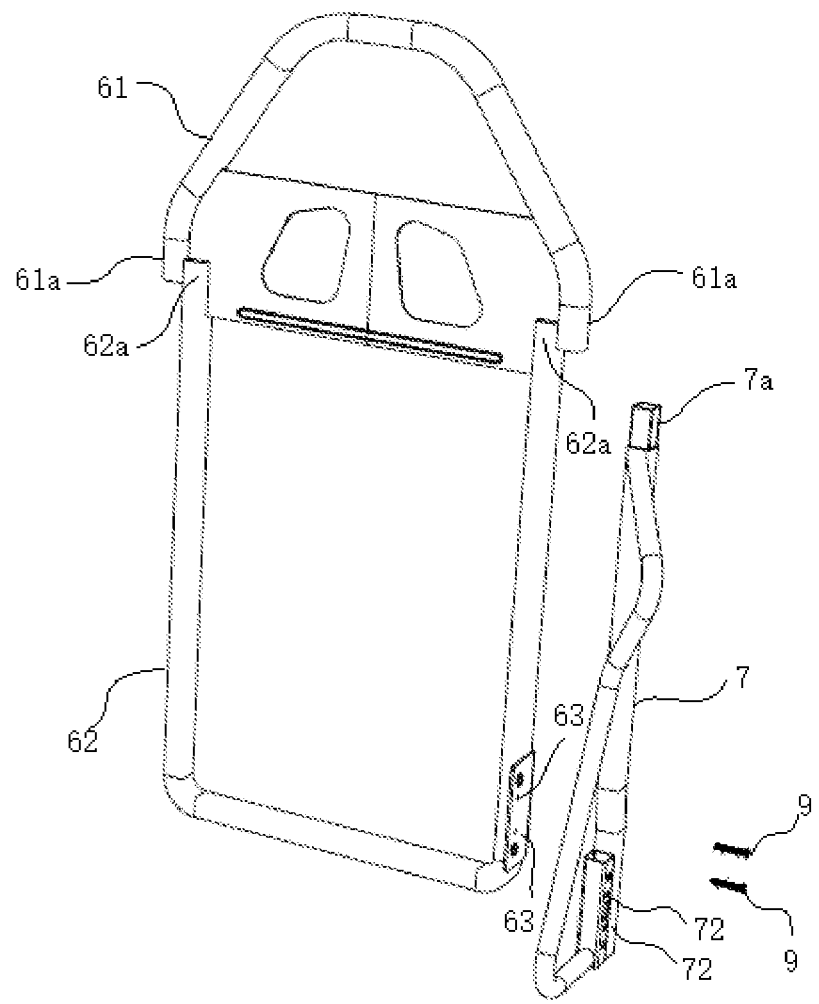
FIG. 2 is a schematic diagram of the backrest connection structure of the detachable gaming chair of the present invention.

The connection structure of the backrest main body of the present invention and the left and right wings will be described in detail below with reference to FIG. 2. For the sake of brevity and clarity, the left wing is taken as an example for description in this article, but those skilled in the art should know that the connection structure of the left and right wings is the same. In a preferred embodiment, the outer diameter of the upper end 7a of the left wing 7 is slightly smaller than the inner diameter of the lower end 61a of the upper frame 61. The upper end 7a of the left wing 7 can be a square tube, and the lower end 61a of the upper frame 61 also has a square tube nozzle (opening). The upper end portion 7a of the left wing 7 can be inserted into the nozzle of the lower end 61a of the upper frame 61 to form a square tube butt-insertion structure.

In addition, the two sides of the backrest main body 6 are also threadedly connected with the left and right wings 7 and 8. In a preferred embodiment, the first threaded hole 63 is provided at one end of the backrest main body 6 close to the seat 2. Preferably, the number of the first threaded holes 63 can be set to two. Correspondingly, the second threaded hole 72 is provided at a position corresponding to the first threaded hole 63 of the left wing 7. Preferably, the number of second threaded holes 72 can also be set to two. The backrest main body 6 and the left wing 7 can be firmly and easily connected by two screws 9 respectively crossing through the second threaded holes 72 and the first threaded holes 63 and tightened.

When connecting the left wing 7 to the left side of the backrest main body 6, first insert the upper end 7a of the left wing 7 into the nozzle of the lower end 61a of the upper frame 61. At this time, the first threaded holes 63 and the second threaded holes 72 correspond, then the screws 9 are crossed through the second threaded holes 72 and the first threaded holes 63 and tightened to conveniently fix the backrest main body 6 with the left wing 7. The left wing 7 can be easily detached from the backrest main body 6 following the reverse steps.

The detachable gaming chair of the present invention adopts a compact backrest structure, which reduces the occupied space, makes the outer contour of the backrest shoulder smoother, and is easy to install and disassemble. In addition, the backrest adopts a square tube butt-insertion structure, which is not easy to rotate, which can make the left and right wings and the backrest main body more firmly connected, and will not be loose or deformed after long-term use.

However, those of ordinary skill in the technical field should realize that the above embodiments are only used to illustrate the present invention, not as a limitation to the present invention. As long as the essence of the present invention is within the scope of the present invention, changes and variants of the above embodiments will fall within the scope of the claims of the present invention.

The invention claimed is:

1. A detachable gaming chair, comprising:
   a backrest including a backrest main body and left and right wings;
   a seat connectable to the backrest;
   two armrests connectable to the seat;
   a bracket provided under the seat; and
   rollers connectable to the bottom of the bracket,
   wherein the backrest main body includes an upper frame and a lower frame, the upper frame and lower frame are hollow tubes, the upper frame has an inverted V shape and the lower frame has a U shape; at a connection point of the upper frame and the lower frame, the lower frame is received inside the upper frame, and the left and right wings are detachably connected to both sides of the backrest main body.

2. The detachable gaming chair according to claim 1, wherein a lower end of the upper frame and an upper end of the lower frame are fixedly connected by welding.

3. The detachable gaming chair according to claim 2, wherein an outer diameter of the upper end of the left and right wings is slightly smaller than an inner diameter of the lower end of the upper frame.

4. The detachable gaming chair according to claim 3, wherein the lower end of the upper frame has a nozzle, and upper ends of the left and right wings can be inserted into the nozzle of the lower end of the upper frame.

5. The detachable gaining chair according to claim 4, wherein the lower end of the upper frame and upper ends of the left and right wings are constructed as a square tube butt-insertion structure.

6. The detachable gaming chair according to claim 1, wherein both sides of the backrest main body are also threadedly connected with the left and right wings.

* * * * *